Sept. 22, 1964    H. G. DEHMELT    3,150,313
MODULATION OF A LIGHT BEAM BY ABSORBING QUANTUM SYSTEMS
EXHIBITING A PERIODICALLY VARYING ALIGNMENT
Filed April 16, 1957    6 Sheets-Sheet 1

INVENTOR.
Hans G. Dehmelt
BY
Attorney

Sept. 22, 1964          H. G. DEHMELT          3,150,313
MODULATION OF A LIGHT BEAM BY ABSORBING QUANTUM SYSTEMS
EXHIBITING A PERIODICALLY VARYING ALIGNMENT
Filed April 16, 1957          6 Sheets-Sheet 3

*INVENTOR.*
Hans G. Dehmelt
BY
*Attorney*

United States Patent Office 3,150,313
Patented Sept. 22, 1964

3,150,313
MODULATION OF A LIGHT BEAM BY ABSORBING QUANTUM SYSTEMS EXHIBITING A PERIODICALLY VARYING ALIGNMENT
Hans George Dehmelt, Seattle, Wash., assignor to Varian Associates, Palo Alto, Calif., a corporation of California
Filed Apr. 16, 1957, Ser. No. 653,180
16 Claims. (Cl. 324—.5)

The present invention relates in general to the optical absorption monitoring of aligned quantum systems and more particularly to novel methods and apparatus for monitoring the time variation of such alignment of atoms or analogous quantum systems by optical radiation modulation techniques.

The present invention utilizes techniques disclosed in U.S. Patent 3,071,721, entitled "Optical Absorption Monitoring of Oriented or Aligned Quantum Systems" filed February 13, 1957, U.S. Patent applications Serial No. 649,190, entitled "Optical Absorption Monitoring of Aligned Alkali Atoms" filed March 28, 1957, and Serial No. 649,191, entitled "Gyromagnetic Resonance of Optically Aligned Alkali Atoms" filed March 28, 1957, the latter being abandoned in favor of Serial No. 350,887 filed March 10, 1964, all by the same applicant, and the reader is referred to these earlier patent applications for a more complete understanding of the basis of the subject invention. There is disclosed in these above cited patent applications the technique of monitoring the orientation or alignment of quantum systems by the measurement of the absorption of energy by the quantum systems from an optical radiation. In the first and third patent applications cited above, an optical radiation monitoring scheme was successfully employed to detect gyromagnetic resonance of the quantum system, the transistions of the quantum system between energy levels resulting in a detectable change of the optical energy absorption. In particular the aforementioned, U.S. Patent application 350,887 discloses a novel method and apparatus for producing alignment of the atoms of the alkali group of elements with long relaxation times in an external magnetic field by optical pumping techniques and the subsequent production and optical detection of radio frequency gyromagnetic resonance of the alkali atoms.

The present invention has for its main purpose the modulation of an optical radiation by absorbing quantum systems exhibiting a (periodically) periodically varying alignment such as occurs in gyromagnetic resonance or free precession of the quantum systems.

In order to explain the essential features we will concern ourselves with three basic processes. In *the first process* the quantum system has to be initially aligned. Alignment here shall means that the expectation values of the angular momentum vectors of the individual quantum systems do not have an isotropic distribution. As a special illustrative concrete case we may take free atoms in the vapor phase which are completely polarized by optical pumping.

In *the second process* a periodic variation of the alignment has to be set up, e.g., we may subject the polarized atoms to a magnetic field. Then this polarization will precess around the field.

In *the third process* the system exhibiting the alignment is subjected to an optical radiation of appropriate spectral characteristics in order to monitor the time variant alignment by means of the time varying absorption for this radiation associated with it. In certain of our illustrative cases we take circularly polarized resonance light which is incident perpendicular to the magnetic field and the pumping beam.

Furthermore one has to consider side effects like disorientation by the monitoring light. Relaxation effects and other dephasing effects will also play a role.

Actually the basic processes do not occur necessarily one after the other but they may take place simultaneously. In the following specification we will try to clarify these steps by discussing hypothetical illustrative examples and then describe various practical embodiments. The latter two cited patent applications employed atoms of alkali elements and in particular sodium atoms to describe preferred embodiments of their respective inventions and this procedure will be followed in this application for continuity. However, it will be immediately obvious to those skilled in the art that this invention is broadly applicable to other atoms and analogous quantum systems in general such as, for example, ions and molecules when found under favorable conditions.

It is, therefore, the object of the present invention to provide a novel method and apparatus for producing and detecting modulation of an optical radiation by time varying aligned quantum systems.

One feature of the present invention is the provision of a novel method and apparatus for applying an optical radiation to a quantum system exhibiting a periodically varying alignment whereby a detectable modulation of the optical radiation may be produced.

Another feature of the present invention is the provision of a novel method and apparatus of the above featured type in which said alignment variations are produced by either forced gyromagnetic resonance precessions or free precessions of the quantum system or by corresponding transitions between hyperfine structure levels.

Another feature of this invention is the provision of a novel method and apparatus of the immediately preceding featured forced precession type in which a signal output from the modulated light detector (photocurrent) is utilized to excite the gyromagnetic resonance or other resonant transitions such as between hyperfine levels of the quantum system whereby, for example, a free running atomic oscillator may be constructed.

Still another feature of the present invention is the provision of novel systems of the types featured above in which the alignment of the quantum system is produced by optical pumping techniques.

Still another feature of the present invention is the provision of a novel method and apparatus for measuring magnetic fields.

Still another feature of the present invention is the provision of a novel method and apparatus for obtaining a double frequency modulation from a precessing quantum system.

These and other features and advantages of the present invention will become apparent from a perusal of the following specification taken in connection with the accompanying drawings wherein, FIG. 5 shows typical oscilloscope traces of the Z beam light and modulated $x$ beam light, respectively, obtained from the system of FIG. 2 employing a 60 cycle sweep modulation while

Similar elements shown in the various figures bear similar references numerals.

Before turning to preferred embodiments of this invention employing alkali metal vapor, it would be well to further clarify the three essential processes by considering at first a hypothetical case for one optical electron atoms or other quantum systems whose nuclear spin is zero. To produce the initial alignment we chose in this illustrative case polarization parallel to the z-axis by optical pumping. The pumping process has been explained in greater detail in the latter two cited patent applications. We summarize briefly pumping employing the optical transitions from the $^2S_{1/2}$ ground state in which a beam of circular polarized resonance light parallel to the z axis is used. Because of the circular polarization the selection rule $\Delta M_z = +1$ applies and only the atoms in the $M_z = -\frac{1}{2}$ state will make transitions to the excited state from which they return indiscriminately (see FIG. 1). Therefore, the $M = +\frac{1}{2}$ ground sublevel will gain atoms at the expense of the $M = -\frac{1}{2}$ sublevel resulting in an overpopulation of this nonabsorbing sublevel, or alignment, this well-known process being termed "optical pumping." This results in a net macroscopic moment along the direction of the magnetic field and is the end result of the optical pumping. In the latter two cited patent applications, the pumping radiation was measured after it had pumped the atoms, the intensity of this transmitted light changing as the relative proportion of atoms in the nonabsorbing and absorbing energy sublevels changed and thus serving as a measure of the alignment.

Besides the creation of the initial alignment by optical pumping as just described a variety of other alignment methods could be mentioned. To name a few one might use alignment of the system by suitable interactions such as with external magnetic or crystalline electric fields at low temperatures, Overhauser effects, spatial selection methods such as used in atomic beam techniques, and also alignment by electron impact.

We now concern ourselves with the second basic process in which a periodical variation of the alignment is introduced. The production methods for the initial alignment mentioned above will generally produce alignments of such a symmetry character that no net precessing or pulsating electric or magnetic moments are exhibited by the system and no phase relations exist between the individual atoms or molecules. All atoms (or molecules) can be considered to be in one of the angular momentum component eigenstates characterized by the quantum number $M_z$, the z axis being the axis of alignment and the alignment specified by the relative population number $a_M (M=J, J-1, \ldots, -(J-1), -J)$. What is needed now is a perturbation which brings the aligned system or a part of it in a state which has to be described by periodically varying plurality a mixture of M states resulting in a variation of the population numbers $a_M = a_M(t)$. We will now have a look at some concrete procedures on how to do this.

Assume $S_{1/2}$ atoms which by optical pumping have all been brought into the $M_z = +\frac{1}{2}$ state. Then $\psi = (+)_z$, where $(+)_z$ is the eigenfunction corresponding to the angular momentum component with respect to the z-axis being equal to $+\frac{1}{2}$, describes the initial state (see FIG. 1a). Let now a magnetic field $H_y$ in the y direction be switched on suddenly which causes the atoms to execute a Larmor precession at the circular frequency $\omega$ in the x, z plane around it. The state is now described by $$\psi = \cos\frac{\omega t}{2}(+)_z + \sin\frac{\omega t}{2}(-)_z$$

and the relative population numbers $$a_{+1/2} = \cos^2\frac{\omega t}{2}; \quad a_{-1/2} = \sin^2\frac{\omega t}{2}$$

show the desired variation. For a beam of circularly polarized resonance light applied along the z=axis so that only $\Delta M_z = +1$ transitions to the excited $^2P_{1/2}$ state can occur, only the fraction $a_{-1/2}$ of the atoms in the $M = -\frac{1}{2}$ state will contribute to the absorption will consequently be modulated at the circular frequency $\omega$ since $a_{-1/2}$ shows this variation.

As another example, consider an assembly of $S_{1/2}$ atoms initially all in the $M_z = +\frac{1}{2}$ state. By some perturbation the initial polarization may have been tipped in a direction $\theta, \phi$ relative to the z-axis. Then the state for which the vector $\langle \vec{M} \rangle$ formed from the expectation values of the angular momentum components $$\langle M_x \rangle, \langle M_y \rangle, \langle M_z \rangle$$

points in the direction $\theta, \phi$ can be described by $$\psi_{\theta,\phi} = \cos\frac{\theta}{2} e^{\frac{-i\phi}{2}}(+)_z + \sin\frac{\theta}{2} e^{\frac{i\phi}{2}}(-)_z \quad [1]$$

where $(+)_z$ and $(-)_z$ denote the two eigenstates with $M_z = +\frac{1}{2}$ and $M_z = -\frac{1}{2}$. Now for the simplest case of an optical transition $J = \frac{1}{2} \rightarrow J' = \frac{1}{2}$ under the influence of circularly polarized light incident parallel to the z-axis for which the selection rule $\Delta M_z = +1$ applies, only the fraction of $\psi$ in the $(-)_z$-state will contribute to the absorption. This fraction is given by $$f_z = a_{-1/2} = \sin^2\frac{\theta}{2} = \frac{1}{2}[1 - \cos\theta] \quad [2]$$

where $\theta$ is the angle between the angular momentum vector $\langle \vec{M} \rangle$ and the beam. This result must be independent of the special choice of coordinate systems and eigenstates. Consequently it must hold quite generally $$f = \frac{1}{2}[1 - (\vec{m} \cdot \vec{p})] \quad [3]$$

where $\vec{m}$ and $\vec{p}$ are unit vectors in the direction of the angular momentum vector $\langle \vec{M} \rangle$ and the beam direction. This convenient vector formulation will be useful if we want to describe the absorption exhibited by an assembly completely polarized in the $\vec{m}$ direction with respect to a circularly polarized beam in the $\vec{p}$ direction. If we subject the system to a static magnetic field $H_0$ in the z-direction the state will vary periodically:

$$\psi = \cos\frac{\theta}{2} e^{\frac{-i\omega t}{2}}(+)_z + \sin\frac{\theta}{2} e^{\frac{-i\omega t}{2}}(-)_z$$

The vector $\langle \vec{M} \rangle$ precesses around the z-axis with constant angle $\theta$ (see FIG. 1b). In the transmitted circular polarized resonance light we can now actually "see" the atoms precessing. According to Formula 3 only the momentum component in the beam direction counts. The modulation depth of a beam in the $x$ direction will be a measure of variation of $\langle M_x \rangle$, that of a beam in the $y$ direction will be a measure of the $\langle M_y \rangle$ component variation. Numerically one gets for the absorbing fraction for the x-beam:

$$f_x = \frac{1}{2}[1 - \sin\theta \cos\omega t]$$

Thus this precessional motion may be utilized to modulate the intensity of an optical radiation directed in the $x$ direction at the frequency of the precession. Similar expressions are to be expected for optical transitions involving higher $J \rightarrow J'$ values when the ground state is executing a precessing motion.

As a perturbation for tipping the initial polarization by an angle $\theta$ against its original $z$ direction, we choose the application of a magnetic R.F. field $H_1$ of the same frequency as the free precession frequency in the $H_0$ field and perpendicular to $H_0$. This pulsating field $H_1$ can now be decomposed into two components rotating around the z-axis in opposite senses. Only the component rotating in the same sense as the atomic precession need be considered. Seen from a coordinate system rotating at the same frequency as the atomic precession, the motion of the atomic magnetization is the same as if only a static field of strength $H_1/2$, perpendicular to the $z$-axis, would be applied in the rotating system. The magnetization simply precesses around $H_1/2$ in the rotating system with a circular frequency $$\omega_1 = \gamma \frac{H_1}{2}$$

(see FIG. 1c). Any desired tipping of the initial polarization can therefore be achieved by turning on an R.F. pulse of the right intensity and duration.

Further examples of precessing motions of electronic momenta which may be used for modulation purposes are found in the ones caused by crystalline electric fields or the ones due to electric and magnetic interaction with the atomic nucleus.

The motion in the last case of magnetic interaction with an atomic nucleus will now be described. By assuming a purely magnetic interaction of the $S_{1/2}$ electronic state with a hypothetical nucleus of infinitely large angular momentum $\vec{I}$ we have essentially the same situation as that discussed above with relation to FIG. 1b. The electronic angular momentum $\vec{J}$ precesses now around $\vec{I}$ as explained above for M around $H_0$ (see FIG. 1d). Normally the electron will be in one of the energy eigenstates characterized by the angular momentum values $F_1 = I + J$ for which electron and nuclear spin are parallel and $F = F_2 = I - J$ for which they are antiparallel. But by applying the R.F. magnetic field of the appropriate frequency perpendicular to $\vec{I}$ we can tip $\vec{J}$ and the described precession occurs. If we have initially brought all systems into one F-state, e.g. the $F_1 = I + J$ state and, furthermore, made all vectors point in the $+z$ direction, then we have exactly the same situation as in the previous example. Consequently a beam of circularly polarized resonance light applied in the x-direction will experience the same type of modulation at the precession frequency $$\nu_{\text{H.F.S.}} = \frac{|E_2 - E_1|}{h}$$

as described in the previous example. The circumstance that the electronic momentum $\vec{J}$ is coupled to another angular momentum $\vec{I}$ has, however, the consequence that other alignment situations can arise which do not exhibit an initial polarization and concurrent net magnetization.

Figures 1, 2:
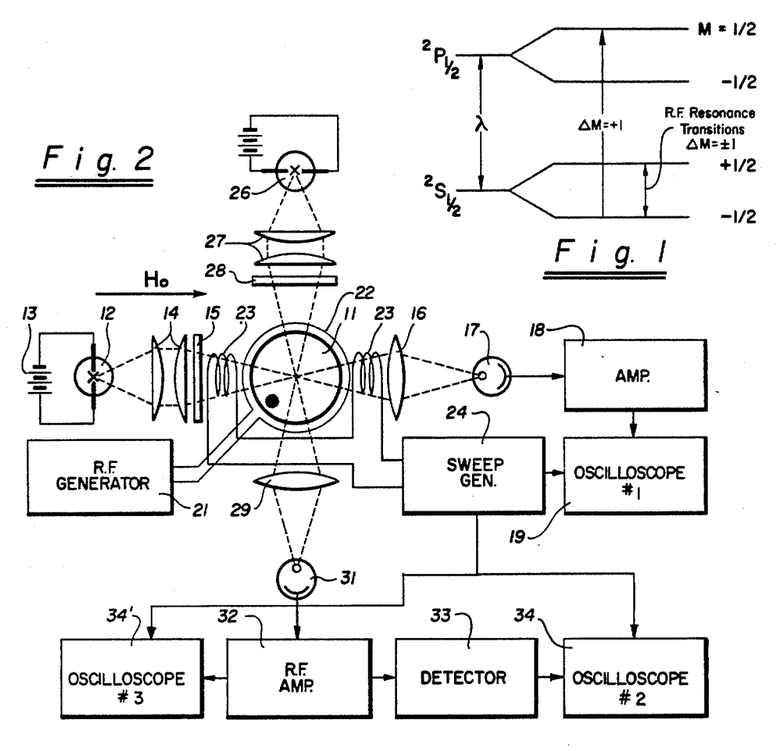
FIG. 1 is a schematic diagram depicting the energy levels of a hypothetical case of atoms containing one valence electron whose nuclear spin is zero.
FIG. 2 is a block diagram of one embodiment of the present invention utilizing sodium atoms aligned by optical pumping.
Figure 1A:
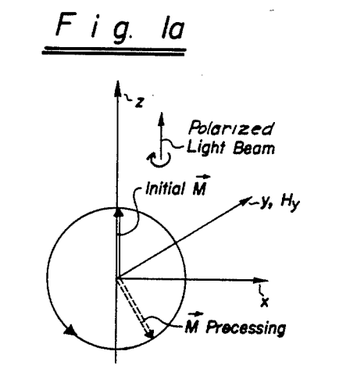
FIGS. 1a through 1e are vector diagrams illustrating different precessional motions of quantum systems under various conditions.
Figure 1B:
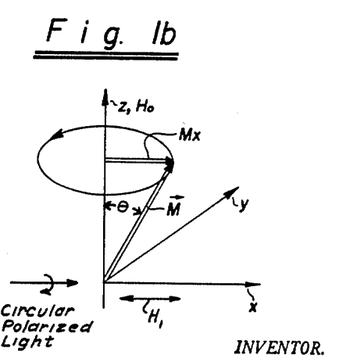
Figures 1C, 1D:
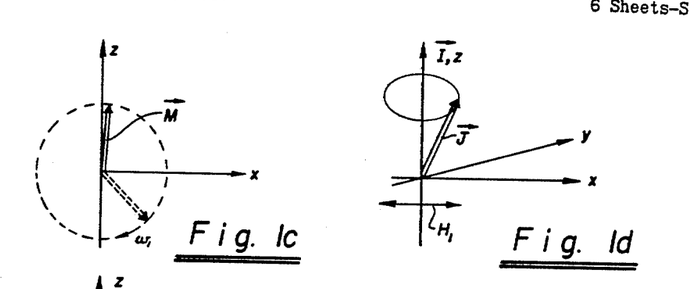
Figure 1E:
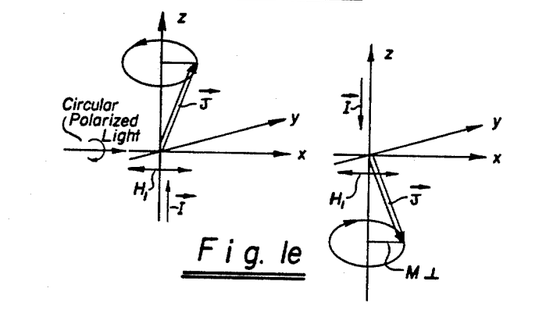

Let us now consider the case where all systems are in the $F = I + J$ state with half of them having $\vec{F}$ pointing in the positive z-direction and the other half pointing in the negative z-direction (see FIG. 1e). If we now apply an $H_1$ field for a short time then each half system will show the same type of precession as discussed above. The precessions will however be of opposite sense and have such a phase relation that the resultant of the perpendicular components $M_\perp$ is an oscillating component in the x-direction, the direction of the R.F. field.

This is in agreement with energy conservation considerations. Let us assume $E_1 < E_2$ ($E_1$ corresponding to $F_1 = I + J$) and ($E_2$ corresponding to $F_2 = I - J$). Then tilting $\vec{J}$ against $\vec{I}$ means an increase in energy and this energy must be provided by the tilting agent $H_1$. There must then exist a periodically varying magnetization component $M_x = M_\perp \cos \omega t$ giving rise to an absorbed power $$P = \frac{dE}{dt} = H_x d\frac{M_x}{dt} = -\omega M_\perp H_1 \cos^2 \omega t$$

where $H_x = H_1 \sin \omega t$

This result can be considerably generalized: consider systems in which the $S_{1/2}$ atom is subject to some arbitrary interaction leading to a corresponding scheme of energy levels. If then magnetic dipole transitions can be induced between two of these levels by a coherent R.F. field, where the transition element involves contributions by the atomic moment of $S_{1/2}$ ground state, then a beam of circularly polarized light applied in the direction of the R.F. field will experience a modulation at the R.F. field frequency but 90° out of phase. The modulation depth will be proportional to the square root of the R.F. transition probability for a given R.F. field strength.

For the practical important case that the electron spin S is strongly coupled to the nuclear spin I to form a total angular momentum F, we proceed as follows. The adsorbing fraction is still determined by the amount of $(-)_z$ in the wave function, which is also reflected in the magnetic moment component $\mu_z$. For example for the case $I = \frac{3}{2}$, $F = 2$, $M_F = -2$ we have $$\mu_z = M_B \cdot g_F \cdot M_F = -\mu_B$$

the same as for the $M = -\frac{1}{2}$ state of the one electron atom ($\mu_B$ being the Bohr magneton). However for $F = 1$ that is not the case anymore. Here we get, for $M_z = +1$, $\mu_z = \mu_B \cdot \frac{1}{2}$. This indicates that the state contains $\frac{3}{4}$ $(-)_z$ and $\frac{1}{4}$ $(+)_z$ indicating only 75% of the absorption obtained in the previous cases where $M_z = -\frac{1}{2}$. We now modify our formula for the absorbing fraction to $$f = \frac{1}{2}[1 - e\vec{m} \cdot \vec{p}] = \frac{1}{2}\left[1 - \left(F + \frac{J(J+1) - I(I+1)}{F+1}\right)(\vec{m} \cdot \vec{p})\right]$$

where $e = g_F \cdot F$ is the "effective electron number" of the F state in question and thus arrive at a description for the finite nuclear spin case. Similar to the zero spin case complete polarization is assumed. For our numerical example $J = \frac{1}{2}$, $I = \frac{3}{2}$ which applies for Na and Rb we obtain consequently $$F = 2 \quad f = \frac{1}{2}[1 - (\vec{m} \cdot \vec{p})]$$

$$F = 1 \quad f = \frac{1}{2}\left[1 - \left(\frac{1}{2}\right)(\vec{m} \cdot \vec{p})\right]$$

indicating only half as much orientation dependence for $F = 1$ as for $F = 2$.

If one wants to formulate still more general conditions under which modulation of a circular polarized beam of resonance light, capable of inducing $S_{1/2} - P_{1/2}$ transitions, will be caused by suitable motions of the $S_{1/2}$ (ground) state, one may proceed as follows: the ground state motion can be described by a set of energy eigenvalues, $E_1$, $E_2$ ... and corresponding eigenstates $\psi_1, \psi_2$ ... where, for example, $$\psi_1 = \mu_1 e^{-i\left(\frac{E_1}{\hbar}\right)t}, \qquad \psi_2 = \mu_2 e^{-i\left(\frac{E_2}{\hbar}\right)t}$$

The initial alignment or first process may have brought about population of $E_1$ only. In the second basic process the perturbation may have admixed some $E_2$, all atoms being in phase. The state can then be described by $$\psi(t) = \alpha_1 \mu_1 e^{-i\left(\frac{E_1}{\hbar}\right)t} + \alpha_2 \mu_2 e^{-i\left(\frac{E_2}{\hbar}\right)t}$$

where $|\alpha_1|^2$ and $|\alpha_2|^2$ will not be time dependent. The $\mu$'s will contain the electron spin eigenfunctions for the $S_{1/2}$ ground state as factors. In order to find out the absorption which a circular polarized beam of resonance light in the $\vec{p}$ direction experiences we form the probability amplitude $|((-)_p \cdot \psi)|^2$. This can be computed by the conventional calculating procedures of quantum mechanics.

In this following example we consider the modulation of a light beam polarized so as to produce $\Delta M=0$ optical transitions and we show that in this case it is possible to observe modulation at twice the frequency of precession. For this example we consider a two optical electron quantum system, for example a mercury atom, and assume that the total angular momentum in the ground state is one while that in the excited state is zero. In this case light can be absorbed only by the component of the ground state wave function for which $M=0$. We proceed as follows: if the angle of precession at any instant of time is $\theta$ then the ground state wave function can be written as $$\left(\cos\frac{\theta}{2}(+)_1 + \sin\frac{\theta}{2}(-)_1\right)\left(\cos\frac{\theta}{2}(+)_2 + \sin\frac{\theta}{2}(-)_2\right)$$

where subscripts 1 and 2 refer to the electrons. By algebra this becomes $$\cos^2\frac{\theta}{2}(+)_1(+)_2 + \sin\frac{\theta}{2}\cos\frac{\theta}{2}(-)_1(+)_2$$
$$+\sin^2\frac{\theta}{2}(-)_1(-)_2 + \cos\frac{\theta}{2}\sin\frac{\theta}{2}(+)_1(-)_2$$

We can rewrite this in the $J$, $M$ representation where $J=1$, $M=\pm 1$ or $0$, in which case it becomes $$\cos^2\frac{\theta}{2}(+1) + \sin^2\frac{\theta}{2}(-1) + \sqrt{2}\sin\frac{\theta}{2}\cos\frac{\theta}{2}(0)$$

The absorption of light polarized to produce $\Delta M=0$ optical transitions is proportional to the square of the coefficient of the (0) term, that is, to $$2\sin^2\frac{\theta}{2}\cos^2\frac{\theta}{2}$$

By elementary trigonometry we have $$2\sin^2\frac{\theta}{2}\cos^2\frac{\theta}{2} = \frac{1}{2}\sin^2\theta = \frac{1}{4}(1-\cos^2\theta)$$

If the incident light is polarized with its magnetic vector in the plane of precession (that is, perpendicular to the D.C. magnetic field) and if $\omega$ is the angular frequency of precession, then the light intensity will be given by $$f = \frac{1}{4}(1-\cos 2\omega t)$$

which has a modulation at the precession frequency. Because we are using plane polarized light we can either have $\Delta M=0$ or $\Delta M=+1$ and $-1$ simultaneously, according to the frame of reference. In either case there is no observable net magnetic moment. As for equal population of $M=0$, $\pm 1$ the angular dependence must vanish. The complementary dependence to the one just discussed for equal numbers in $M=+1$ and $M=-1$ must be shown for complete initial alignment in $M=0$. Although there is no net macroscopic moment there are, of course, moments of the individual atoms and these can be made to precess by a magnetic R.F. field. As initial alignment we chose again ½ in $M=1$ and ½ in $M=-1$ for $\theta=90°$ and linear light polarization in the $y$ direction. For all these cases where there is no net magnetization, no energy has to be provided by the R.F. field to turn the alignment in order to cause the light beam modulation.

In most practical systems a polarization created once will not persist forever but rather decay soon due to various disorienting effects. It is therefore necessary to keep continuously polarizing the sample while the second and third basic processes are going on. For a detailed example we chose the gyromagnetic motion occurring in a system of $J=\frac{1}{2}$, $I=\frac{3}{2}$ (Rb$^{87}$) atoms in the $F=2$ state under the influence of a magnetic field which may have several time dependent components. The system is continuously pumped by the $\Delta M=+1$ pumping described earlier by means of a beam of resonance light in the $z$ direction (not necessarily $D_1$ light) to overcome the disorienting effects. We now wish to set up equations of motion which give us $\vec{M}=\vec{M}(+)$. For a monitoring beam of circularly polarized $D_1$ light in the $\vec{p}$ direction the resulting time dependent absorption will then be described by $$f_p = \frac{1}{2}\left[1 - \left(\frac{1}{M_0}\right)(\vec{M}(t)\cdot\vec{p})\right]$$

where $M_0$ corresponds to complete polarization while $M(t)$ can be smaller. This follows from the reasoning above by taking into account that half of the unoriented atoms will be absorbing. We will have three principal causes which will make $\vec{M}$ time variant, namely the torque exerted by the magnetic field, the pumping and disorienting effects of the light beams and finally relaxation effects. The effect of the magnetic field is described by $$\frac{d\vec{M}}{dt} = \gamma[\vec{M}\times\vec{H}]\gamma = \mu_B \cdot g_F$$

The effect of a beam of circularly polarized resonance light is twofold. First it will create a polarization in its direction $\vec{p}$ according to $$\frac{dM_p}{dt} = \left(\frac{1}{\tau_p}\right)(\overline{M} - M_p)$$

where $\overline{M}$ is the saturation polarization for infinite light intensity which depend on the relative intensity of $D_1$ and $D_2$ light present in the beam. The pumping time constant $\tau_p$ is inversely proportional to the light intensity.

A polarization $M_\perp$ perpendicular to the light beam will be destroyed with the same time constant $\tau_p$:

$$\frac{dM_\perp}{dt} = -\left(\frac{1}{t_p}\right)M_\perp$$

The relaxation effects due to collisions and field inhomogeneities, etc., are assumed to be describable by the two relaxation times $T_1$ and $T_2$:

$$dM_{z/dt} = -\left(\frac{1}{T_1}\right)M_z$$

$$dM_{x/dt} = -\left(\frac{1}{T_2}\right)M_x$$

$$dM_{y/dt} = -\left(\frac{1}{T_2}\right)M_y$$

The magnetic field direction has been assumed in the $z$-direction. By superimposing the above time variations we obtain:

$$\dot{M}_x = \gamma[\vec{M}\times\vec{H}]_x - \left(\frac{1}{\tau_z}\right)M_x + \left(\frac{1}{\tau_x}\right)(\overline{M}_x - M_x) - \left(\frac{1}{T_2}\right)M_x$$

$$\dot{M}_y = \gamma[\vec{M}\times\vec{H}]_y - \left(\frac{1}{\tau_z}\right)M_y - \left(\frac{1}{T_2}\right)M_y - \left(\frac{1}{\tau_x}\right)M_y$$

$$\dot{M}_z = \gamma[\vec{M}\times\vec{H}]_z + \left(\frac{1}{\tau_z}\right)(\overline{M}_z - M_z) - \left(\frac{1}{\tau_x}\right)M_z - \left(\frac{1}{T_1}\right)M_z$$

For very weak $x$-beam intensity $$\left(\frac{1}{\tau_x}\right)\to 0$$

As long $$\left(\frac{1}{\tau_x}\right) \lesssim \left(\frac{1}{\tau_z}\right)$$

only minor modification to the above behavior result by taking the terms with $$\left(\frac{1}{\tau_x}\right)$$

into account.

Referring now to FIG. 2 there is shown one embodiment of the present invention in which the initial polarization is generated by optical pumping. It utilizes an evacuated spherical glass absorption vessel 11 of about 1 liter containing a small amount of metallic sodium in equilibrium with its vapor and containing argon at a pressure of about 30 mm. Hg. The absorption vessel is heated to such a temperature (130–150° C.) that about 50% absorption occurs. The argon acts as a buffer gas for the sodium and it results in the realization of a relaxation time of about .21 second for the alignment of the sodium atoms. The actual vapor pressure under the conditions of the experiment was about $10^{-7}$ mm. based on a calculation involving the light absorption and on the assumption that equilibrium was not reached between absorption by the glass walls and vaporization from the metallic surface. However, in embodiments employed up till now, the surface area in the absorption vessel covered by the alkali metal was approximately 1/10 the total area inside the vessel, so that one would expect a reasonably close approach to vapor pressure equilibrium under these temperature conditions.

Figures 3, 6:
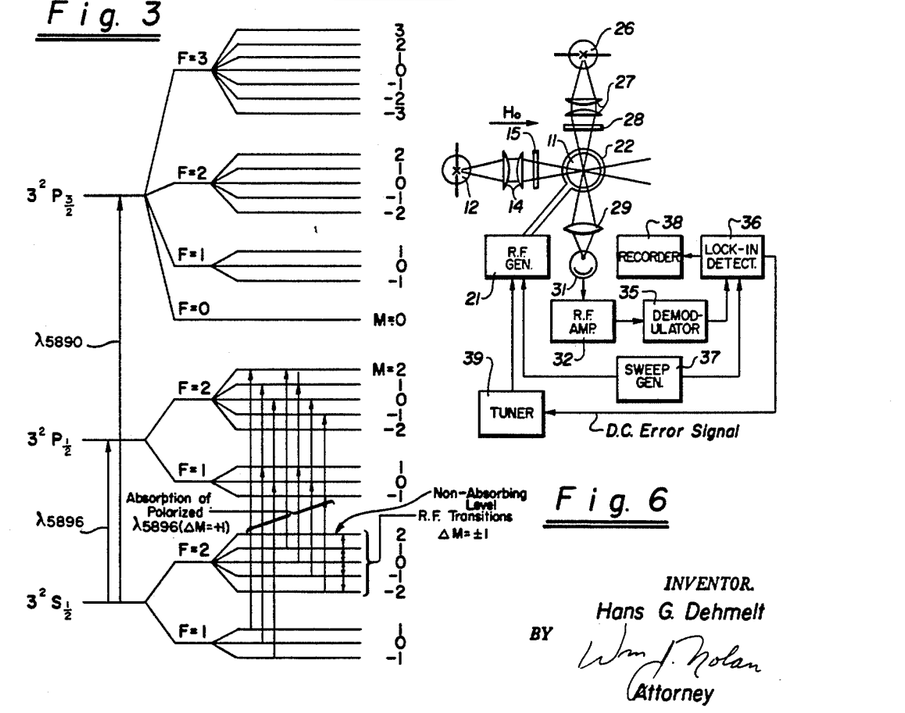
FIG. 3 is a schematic diagram depicting the energy levels of the sodium atoms of particular interest and the transitions therebetween; since not relevant for the present discussion no attention has been paid to the signs of the $g$-factors associated with the various F-levels.
FIG. 6 is a block diagram of another embodiment of the present invention similar to FIG. 2 but modified to provide a novel magnetic field measuring method and apparatus.

The ground or lowest energy state of the sodium atoms is the $3^2S_{1/2}$ level which, due to total angular momentum considerations, is split into two hyperfine states $F=1$ and $F=2$ (see FIG. 3). The vessel is located in a magnetic field $H_0$ which may, for example, be the earth's magnetic field, and the $F=1$ hyperfine state is spilit into three Zeeman sublevels $M=0$, $\pm 1$ while the $F=2$ hyperfine state is split into five Zeeman sublevels $M=0$, $\pm 1$, $\pm 2$, these Zeeman sublevels being spaced apart in the atomic spectrum by the Larmor frequency of the sodium atoms in the magnetic field $H_0$; in an earth's magnetic field of ½ gauss this Larmor frequency is approximately 350 kc.

A source of optical radiation of λ5896 Angstrom units is provided comprising a commercial sodium arc lamp 12 operated from a battery 13, the lamp being mounted in a Dewar (not shown). A General Electric type NA-1 sodium lamp has been employed; in recent potassium experiments an Osram potassium spectrum lamp was used. The radiation from this sodium lamp is focused by a condenser lens 14 through a circular light polarizing sheet 15 into the absorption vessel 11. In this particular embodiment of the invention, the optical radiation is parallel to the magnetic field $H_0$ and the circular polarization is clockwise looking from the source 12 to the vessel 11 or right polarized. The optical radiation from the lamp 12, after it has passed through the vessel 11, is focused by lens 16 upon a vacuum photocell 17 whose output is amplified by a broad band amplifier 18 and displayed on an oscilloscope 19 or graphic recorder.

In accordance with known quantum theory selection rules, the circularly polarized optical radiation induces $\Delta M=+1$ transitions of the sodium atoms between the ground state $3^2S_{1/2}$ and the higher energy state $3^2P_{1/2}$ which are separated λ5896 in the spectrum. The $3^2P_{1/2}$ state (see FIG. 3) is split into two hyperfine states $F=1$, 2 which are in turn split into three and five Zeeman sublevels, respectively. Due to the selection rule $\Delta M=+1$ the positive Z-axis pointing in the direction of the light beam, all of the sodium atoms in the Zeeman sublevels in the $3^2S_{1/2}$ state except those in the $M=+2$ sublevels of the $F=2$ hyperfine level absorb energy from the λ5896 radiation and are raised to the $3^2P_{1/2}$ level. The atoms in this higher level may return to the ground state sublevels by giving up the necessary quanta of energy by reradiation or the like and quantum theory rules permit the atoms to return to the different sublevels without discrimination. As a result, the nonabsorbing $M=+2$ sublevel gains atoms at the expense of the other sublevels until a saturation polarization is attained.

The amount of radiation absorbed by the sodium atoms may be determined by means of the photoelectric cell 17, the D.-C. output of the photocell 17 being a direct function of the λ5896 radiation impinging thereon. Thus increased radiation absorption in the absorption vessel 11 will result in a decrease in the D.-C. output from the photocell 17 which may be viewed as an increased or decreased signal, by selection of suitable electrical amplification means, on the oscilloscope 19.

Actually, the process of optical pumping for alignment of the sodium atoms is more complex than the simple illustration given above as explained in the above cited patent application entitled "Optical Absorption Monitoring of Aligned Alkali Atoms." There is also present in the sodium light source a λ5890 radiation in addition to the λ5896 (these two radiations are the so-called D lines of sodium) and this λ5890 radiation is of the proper frequency to raise the sodium atoms from the ground state to the $3^2P_{3/2}$ energy state which is composed of four hyperfine states $F=0$, 1, 2 and 3 which in turn comprise 16 Zeeman sublevels. This affects the number of sodium atoms which populate the sublevels of the ground state but a preponderance of one radiation or the other insures an alignment. Commercial sodium lamps are readily available in which a substantial differential exists between the intensity of the two D lines. Also, one or the other of these D lines may be filtered out if desired.

Other alignment processes will immediately occur to those skilled in this art such as, for example, by a circular polarization of the transmitted sodium light opposite, that is, counterclockwise, to that in the above illustration, the quantum theory selection rule $\Delta M=-1$ governs and the $M=-2$ magnetic sublevel of the hyperfine $F=2$ level of the ground state is the nonabsorbing level and becomes overpopulated relative to the remaining magnetic sublevels.

Any effect which tends to change the relative populations of the magnetic sublevels and produce a change in the number of atoms in the absorbing sublevels will produce a change in the intensity of the transmitted light. A substantial increase of the λ5896 radiation absorption by the sodium atoms may be accomplished by producing a paramagnetic resonance realignment of the sodium atoms in the energy state $3^2S_{1/2}$ so as to cause transitions between the Zeeman sublevels. Thus, by applying, by means of a suitable signal generator 21 and a radio frequency coil 22 adjacent the absorption vessel 11, a radio frequency magnetic field $H_1$ perpendicular to the direction of the magnetic field $H_0$ and of the Larmor frequency (350 kc.) of the sodium atoms in the earth's magnetic field $H_0$ of approximately ½ gauss, a resonance of the sodium atoms occurs wherein $\Delta M=\pm 1$ transitions are induced between the magnetic sublevels. The absorbing Zeeman sublevels will now be populated at the expense of the nonabsorbing Zeeman sublevel $M=+2$ during the resonance transitions. This increased population of the absorbing sublevels results in a substantial weakening of the λ5896 light detected by the photocell. By modulation techniques common to those skilled in the art of gyromagnetic resonance, such as, for example, by modulating the magnetic field $H_0$ with an audio sweep magnetic field by use of suitable modulation coils 23 and associated sweep generator 24, the point of maximum paramagnetic resonance may be periodically swept through and viewed on the oscilloscope 19, the horizontal sweep plates of which are coupled to the audio generator 24. It is apparent that modulation of the frequency of the radio frequency field $H_1$ may be utilized to sweep through resonance rather than modulation of the magnetic field $H_0$. Thus, the paramagnetic resonance may be detected by the expedient of monitoring the alignment of the sodium atoms by the observation of the absorption of polarized optical radiation utilized to initially optically pump the atoms.

Figure 4:
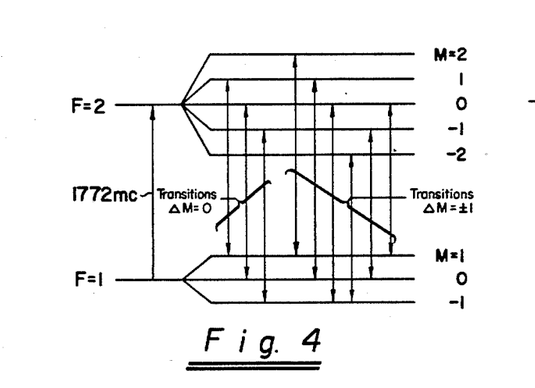
FIG. 4 is a schematic drawing depicting the radio frequency transitions induced between the hyperfine levels of the ground state of the sodium atoms.

A similar situation is encountered when either zero field $\Delta F = \pm 1$; $\Delta M = 0$, $\pm 1$ microwave transitions are induced between the hyperfine F groups by a magnetic radio frequency field of the appropriate direction and frequency—1772 mc. for Na—or I and J are decoupled in strong magnetic fields provided population differences exist between the levels involved in the R.F. transitions. The case of $\Delta F = \pm 1$; $\Delta M = 0$, $\pm 1$ microwave transitions induced between the hyperfine F groups of the sodium atoms is depicted in FIG. 4. With the gyromagnetic resonance frequency magnetic field of 1772 mc./sec. parallel to the unidirectional magnetic field the $\Delta M = 0$ transitions are induced and when perpendicular the $\Delta M = \pm 1$ transitions occur. These methods for detecting gyromagnetic resonance are more fully set forth in the above cited U.S. Patent 3,071,721 and U.S. patent application 649,191 entitled "Gyromagnetic Resonance of Optically Aligned Alkali Atoms."

Another novel method for detecting this gyromagnetic resonance is as follows: A second sodium lamp 26 is positioned so as to direct its beam through a condenser lens 27 and circular polarizer 28 and through the absorption vessel 11 perpendicular to the direction of the first light beam (z-beam) and the magnetic field $H_0$ (FIG. 2). If one defines the x direction as the direction of the R.F. field, then actually this second or cross beam may lie anywhere in the x, y plane or at least may lie so that it has a strong component in the x, y plane, although this beam for convenience throughout this description shall be denoted as the x-beam. For example, in FIG. 1b, the x-beam is directed in the x direction whereas in FIG. 2 the x-beam is directed in the y direction. This x-beam defines a direction in space relative to which we can define a Zeeman level ground state structure identical to the ground state structure shown in FIG. 3. These Zeeman levels will not be energy eigenstates, however, and an atom or group of atoms known to be populating one of these Zeeman levels at a given time may be found in a sublevel differing by one M unit in a time comparable to half a Larmor cycle for the resonance frequency corresponding to the energy difference between the two states.

Apart from the coupling of the electron to the sodium nucleus of spin $I=3/2$ the situation is rather similar to the one electron atom gyromagnetic resonance discussed above. For weak fields, nucleus and electron may be considered as one rigidly coupled unit existing in two varieties characterized by the total angular momenta $F=1$ and $F=2$ with their respective g-factors $g_1 \approx -\frac{1}{2}$ and $g_2 \approx +\frac{1}{2}$. $F=1$ corresponds to the electron spin antiparallel to the nuclear spin and $F=2$ corresponds to the parallel case. The only difference is that now each F will precess separately and modulate according to its "effective electron number" $e$.

The x-beam exhibits the modulation at the precession frequency after passing through the cell 11 since the absorption coefficient $K_x$ of the partially polarized sodium vapor will vary according to $$K_x = K\left[1 - a\left(\frac{M_x}{M_0}\right)\right]$$

where K is the absorption coefficient for the unpolarized vapor while $a$ is a dimensionless constant depending on the $D_1/D_2$ intensity ratio and also on the effective electron number defined above. The absorption of the z beam on the other hand, as determined by $$K_z = K\left[1 - a\left(\frac{M_z}{M_0}\right)\right]$$

provides a measure of $M_z$. Under favorable conditions R.F. fields of the order of microgauss can be made to modulate intense light beams.

Figure 5:
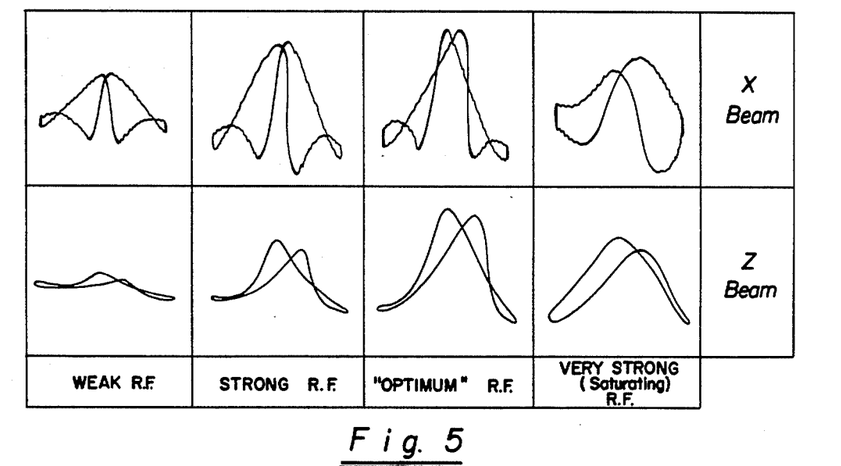
Figure 5A:
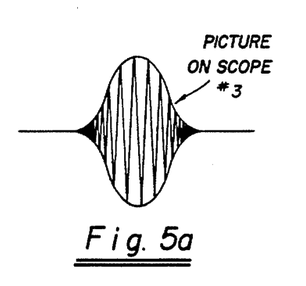
FIG. 5a shows another oscilloscope trace of the $x$ beam light.

The x- beam light, the intensity of which has been modulated by the precessing atoms at the precessional frequency, is focused by lens 29 as it leaves the vessel 11 onto a photocell 31. The amplitude modulated output signal may be amplified in amplifier 32 and transmitted to detector 33 for subsequent display on oscilloscope 34. Representative oscilloscope traces of the z beam light, lower traces, and rectified modulated x-beam light, upper traces, are shown in FIG. 5 with a 60 cycle sweep field employed. The traces from left to right are obtained with increasing magnitudes of radio frequency magnetic field. In addition the trace which at resonance would be visible on the oscilloscope 34' is depicted schematically in FIG. 5a. Of course, when it is desired to observe only the modulated x-beam light and not the z-beam light, lens 16, photocell 17, amplifier 18 and oscilloscope 19 may all be omitted from the system of FIG. 2.

It should be noted that it is possible to observe the modulation of the x-beam if it is originally unpolarized but an analyzer is placed in front of the photocell 31 so that the cell 31 sees only one component of circular polarization of the x beam. This occurs because each component of circular polarization in the unpolarized x beam is modulated merely by the presence of a precessing orientation, although the modulations are 180° out of phase and therefore cannot be detected in the unpolarized light beam. Detection of the precession by this method is not as useful as by the method using polarized light, since the unused component of polarization depumps the sample. Quite generally it is possible to exchange light source and light receiver without affecting the modulation process.

The variation of the three components of the magnetic moment vector $M_x$, $M_y$, $M_z$ as a function of time, light intensity and magnetic field can be described by the equations:

$$\frac{dM_x}{dt} + \gamma[\vec{H} \times \vec{M}]_x + \frac{M_x}{\tau_2} = \left(\frac{1}{\tau_x}\right)\overline{M}_x$$

$$\frac{dM_y}{dt} + \gamma[\vec{H} \times \vec{M}]_y + \frac{M_y}{\tau_2} = 0$$

$$\frac{dM_z}{dt} + \gamma[\vec{H} \times \vec{M}]_z + \frac{M_z}{\tau_1} = \left(\frac{1}{\tau_z}\right)\overline{M}_z$$

where $\tau_1$ and $\tau_2$ are relaxation times determined by the intensity of the light beams and by thermal and relaxation processes; $\tau_2$ also reflects field inhomogeneities. The amplitude of the modulated signal in the light beam in the x direction is proportional to $M_x/\tau_x$, where $\tau_x$, $\tau_z$ are quantities inversely proportional to the beam light intensities and are the relaxation times which would be observed in the sample if the D.C. magnetic field were shifted to lie in the x, z directions and if thermal relaxation effects were absent. If one varies the intensity of the x-beam, and hence $\tau_x$, while keeping all other quantities constant, then it can be shown that maximum signal is obtained when $\tau_x \approx \tau_z$. In practice, this indicates that both light beams should have approximately equal intensity for optimum operation although this is in no way critical.

In the case of the low frequency transitions between the Zeeman sublevels ($\Delta M = \pm 1$), it is necessary that the x-beam have a propagation direction component perpendicular to the $H_0$ field. In the case of high frequency transitions between the F levels, for $\Delta M = \pm 1$ transitions the x-beam must have a component perpendicular to the $H_0$ field while for $\Delta M = 0$ transitions the x-beam must have a component parallel to the $H_0$ field. In the latter case the net electronic momentum is actually pulsating rather than precessing, however, the term "precession," as used herein, should be understood to comprehend such "pulsation."

In another embodiment of this invention one sodium light beam may be utilized to provide the functions of the two beams of FIG. 2. This single beam, for optimum performance, is directed at a 45° angle to the $H_0$ magnetic field. For this the atoms are initially pumped into a direction parallel to the field. However only the polarization component parallel to the field is preserved while the perpendicular components precess around it and average out. The parallel component can then be subjected to similar experiments as described earlier, e.g. turned by 90° against the field by a radio frequency field and made to precess around $H_0$. There will then be a periodically varying polarization component in the beam direction and the accompanying beam modulation will occur.

FIG. 6 depicts a convenient system for utilizing the x-beam of the present invention for measuring the strength of the $H_0$ field, since the Larmor precession frequency is directly related to the strength of $H_0$. The output of the R.F. amplifier 32 is coupled to a demodulator circuit 35 and then to a lock-in detector 36 which receives its reference signal from the frequency sweep circuit 37. The output of the lock-in detector is transmitted to a recorder 38 which records a D.C. signal proportional to the instantaneous deviation of the R.F. generator frequency from the line center frequency. The frequency to which the generator is automatically adjusted by the error signal from the lock-in via the tuner 39 is a measure of the field strength.

Figure 7:
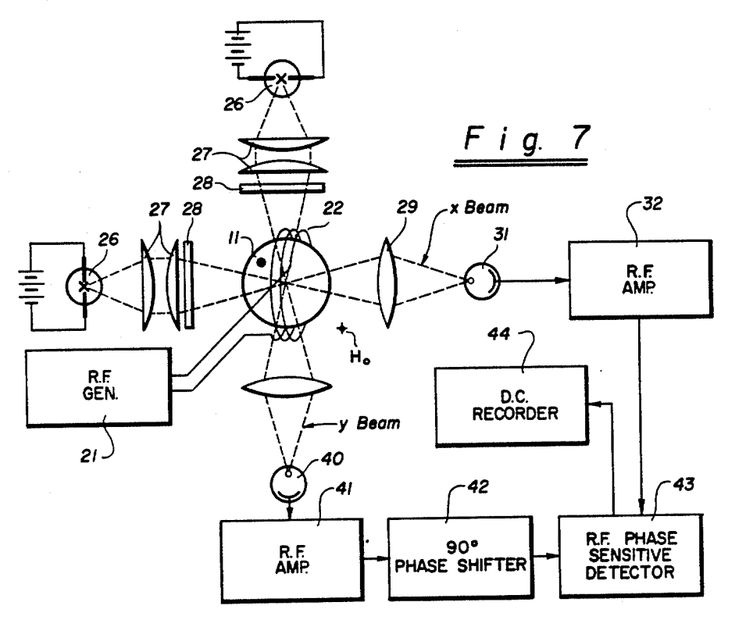
FIG. 7 is a block diagram of a novel "three beam" system constructed in accordance with the present invention.

It should be emphasized that, although in the embodiments utilized to describe the present invention the radio frequency field is shown perpendicular to the x-beam, there is no need that they be mutually normal. There is no way in which the radio frequency field can induce a signal directly in the photosensitive devices 17, 31 nor is there any manner in which incident light can effect passage of radio frequency through the R.F. coil 22. Thus, the transmitting and detecting systems are completely independent of and uncoupled from each other and can in fact be placed in close conjunction physically. The x-beam radiation may be parallel to the applied radio frequency field. This makes possible many different physical forms of this invention. For example, instead of having merely one beam of detecting light one might employ two beams of light, an x-beam and a y-beam, oriented at right angles to each other whose outputs may then be combined as a two phase system to give not merely the frequency but also the sense of the direction of precession. Such a system is illustrated in FIG. 7 assuming alkali atoms aligned by optical pumping, the z beam and magnetic field $H_0$ being in the direction into the sheet of drawings. The output of the y-beam photosensitive detector 40 is fed through amplifier 41 and a 90° phase shifter 42 to an R.F. phase sensitive detector circuit 43 to which the output of x-beam amplifier 32 is also transmitted. The D.C. output of detector 43 whose sign will depend on the sense of the precession is displayed on recorder 44.

In addition, in quantum systems aligned by optical pumping as assumed in FIG. 7, by observing the optical radiation which has accomplished the pumping, one may observe the behavior of the quantum system in the z direction and thus have a display of the behavior of the system in all three components of the polarization.

Figure 8:
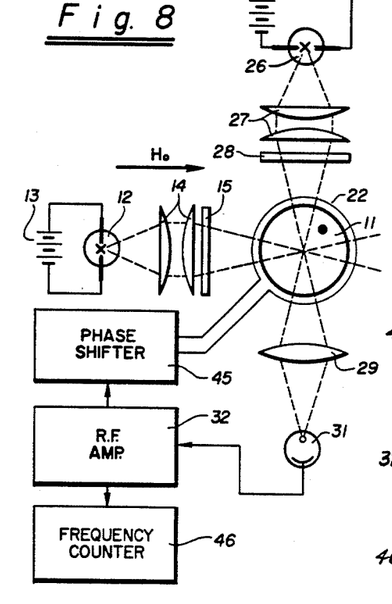
FIG. 8 is a block diagram of a novel oscillator system constructed in accordance with the present invention.

Referring to FIG. 8 there is shown a free running oscillator, the frequency of which is the resonance frequency of the precessing atom moments. A portion of the output of the radio frequency amplifier is fed, through a phase shifter 45, directly to the radio frequency coil 22. Thus a portion of the output energy is fed back to maintain oscillations. As in any feedback oscillator one has to be careful that the feedback signal has just the right phase that oscillation on the center frequency of the resonance occurs in order to insure maximum frequency stability. It is clear that the correct phase shift will be dependent on the angle between the x-beam and the R.F. field direction. The transitions may be Zeeman level transitions (350 kc. in earth's field for sodium ground level transitions) or $\Delta F = \pm 1$, $\Delta M = \pm 1$ hyperfine level transitions (1772 mc. for sodium ground level transitions). Since the frequency of the Zeeman sublevel transitions is directly dependent on the strength of the magnetic field $H_0$, the oscillator frequency operating at such transitions is strongly field dependent. The utilization of this latter device as a magnetic field measuring device is immediately apparent from the relationship between the precessional frequency and the field $H_0$.

Figure 8A:
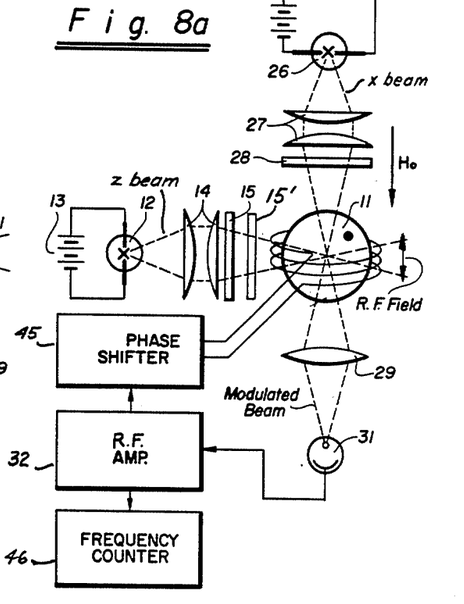
FIG. 8a is a block diagram of another novel oscillator system.

There is shown in FIG. 8a a free running atomic oscillator similar to that shown in FIG. 8 in which a rubidium system and transitions $\Delta M = 0$, $\Delta F = \pm 1$ are utilized. The lamps 12 and 26 in this instance are rubidium lamps and the vessel 11 contains rubidium atoms. A special measure is taken to insure an overpopulation of the $F = 2$, $M = 0$ level with respect to that of the $F = 1$, $M = 0$ level, which is basic to the functioning of the light modulation process. By using a rubidium 87 system rather than a sodium system and an interference filter 15' transmitting only $D_1$ rubidium radiation in the pumping beam nearly all atoms may be concentrated in the $M_z = 2$, $F = 2$ level. By applying a weak D.C. field $H_0$ in the x-direction this polarization is transformed into an alignment with a preferential population of the $F = 2$, $M_x = 0$ level and very small population of the $F = 1$ sublevels. By applying a linear R.F. field in the x-direction $\Delta M_x = 0$ transitions will be induced accompanied by a modulation of the x-beam at the $\Delta F = 1$ H.F.S. transition frequency of 6830 mc./sec.

Figures 8B, 12:
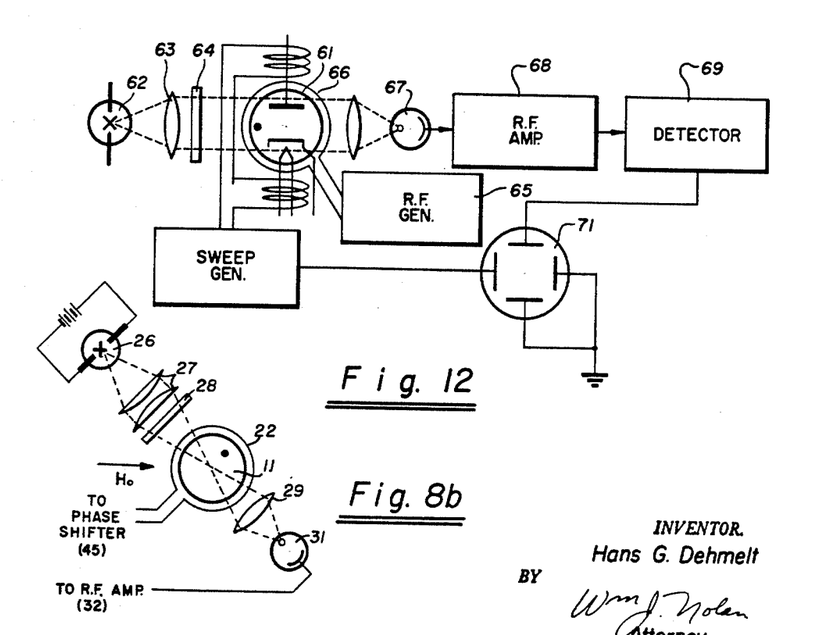
FIG. 8b is a modification of the system of FIG. 8 wherein a single optical radiation beam is used.
FIG. 12 is a block diagram of a novel system for obtaining double frequency modulation of the light beam.

In FIG. 8b there is shown a modification of the free running oscillator of FIG. 8 wherein the crossed beams are replaced, as previously discussed, by a single beam directed at an acute angle (preferably 45°) with respect to the $H_0$ field.

Figure 9:
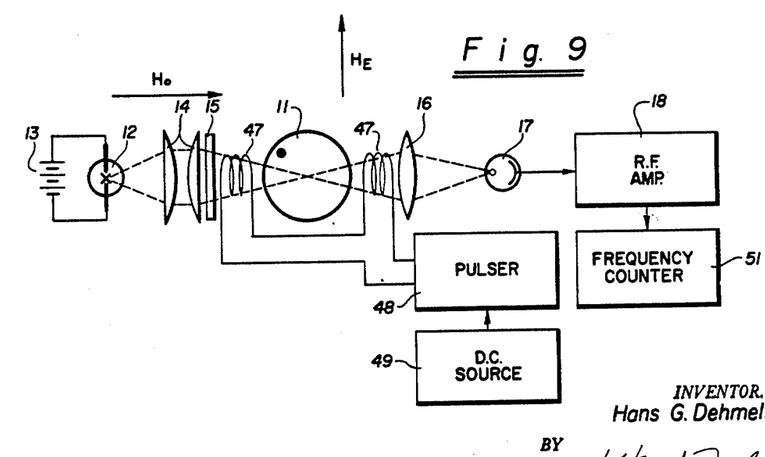
FIG. 9 is a block diagram of a novel free precession system utilizing modulated optical radiation.

The precessing motion of the quantum system necessary to modulate the intensity of the x-beam of light need not be a resonance precession due to the application of a driving radio frequency signal. The modulation may be accomplished by freely precessing quantum systems. For example, in the sodium atom example given above, the sodium atoms may be made to freely precess in a unidirectional magnetic field, such as the earth's field, and an optical x-beam may be directed on the freely precessing atoms, the precessional motion modulating this x-beam. An example of a free precession optically monitored magnetometer is shown in FIG. 9. The circularly polarized optical pumping beam from light source 12 is applied to the absorption vessel 11 at an angle, preferably normal, to the magnetic field $H_E$ to be measured (assume the earth's magnetic field of about ½ gauss). A pulse of unidirectional magnetic field $H_0$ of time length $t_1$ is applied to the sodium atoms parallel to the optical pumping beam by means of coils 47, pulser 48 and source 49. The time $t_1$ is sufficient to produce alignment of the sodium atoms in the polarizing field $H_0$ (about 5 gauss). The pulser 48 operates to turn off the polarizing field $H_0$ rapidly, in a time short compared to a resonance precession cycle of the atoms in the $H_E$ field. Initially, the atoms are thus left polarized perpendicular to $H_E$ around which they now begin to precess freely. This precessional motion modulates the optical radiation from source 12 at the resonance frequency, the modulated light being detected by the photosensitive cell 17 and transmitted through amplifier 18 to a frequency counter 51 which counts the precessional frequency and thus gives a measure of the magnetic field strength of $H_E$.

Figure 10:
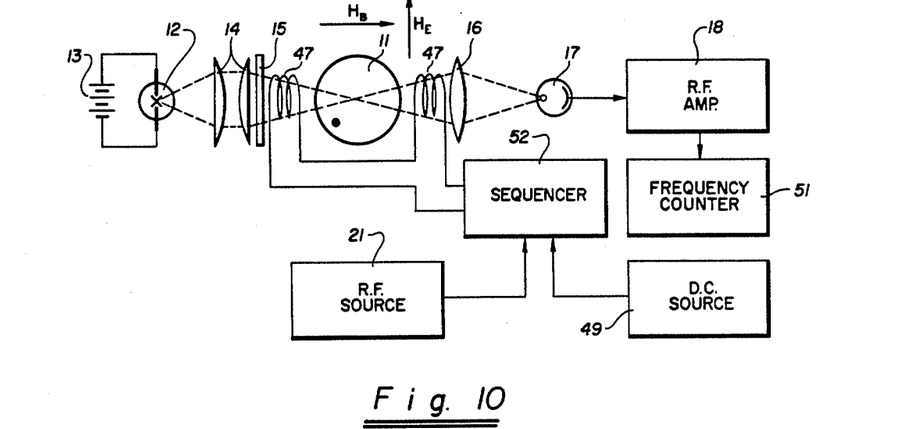
FIG. 10 is a block diagram of another novel free precession system of the present invention.

There is shown in FIG. 10 another embodiment of a free precession magnetometer. A pulse of unidirectional bias magnetic field $H_B$ is applied to the sodium atoms parallel to the optical pumping beam by means of coils 47, sequencer 52 and D.C. source 49, the pulse lasting for a time $t_1$ sufficient to align the atoms in the $H_B$ field. The sequencer operates to turn the $H_B$ field off slowly relative to the resonance frequency cycle and fast relative to the time $t_1$ such that the atoms end up aligned in the $H_E$ magnetic field. A pulse of radio frequency of approximately the resonance frequency of the atoms in $H_E$ is applied to the atoms through the coils 47 from source 21 of sufficient time duration to tip the atom moments through an angle preferably normal to the $H_E$ field direction. On termination of the R.F. pulse, the atoms precess freely in the $H_E$ magnetic field at their resonance frequency and modulate the light beam, the frequency of modulation being measured by the frequency counter 51.

One can also obtain a modulation of the light beam at the Larmor frequency by free precessions in a system similar to FIG. 10 in which the beam direction is at an angle to the earth's field $H_E$, preferably 45°. In this case, no $H_B$ field pulse is necessary but only the radio frequency pulse to tip the magnetization 90° with respect to $H_E$.

Figure 11:
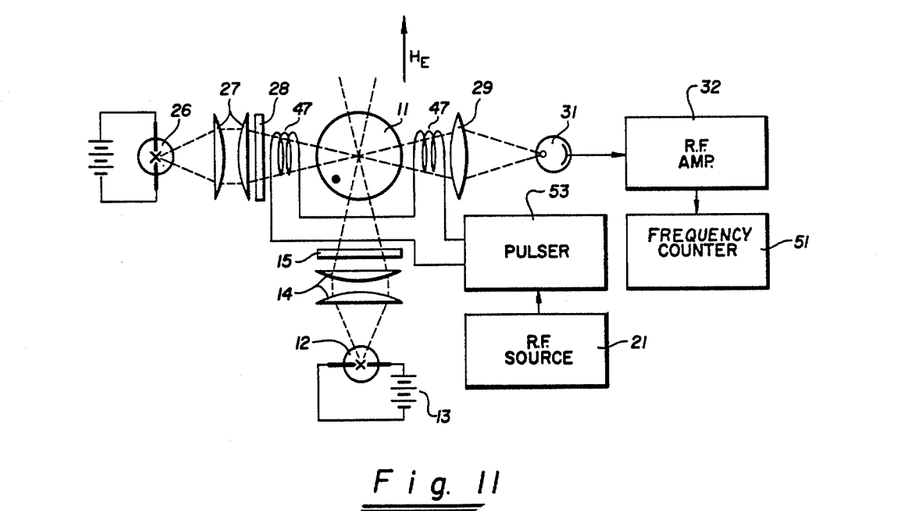
FIG. 11 is a block diagram of still another novel free precession system.

Another free precession magnetometer utilizing both a z-beam and x-beam is disclosed in FIG. 11. The optical pumping beam is supplied from source 12 and is directed parallel to the magnetic field $H_E$, thus aligning the atoms in the field $H_E$. A radio frequency magnetic field pulse is applied, from R.F. source 21 by pulser 53 and coils 47, to the atoms at an angle, preferably normal, to the $H_E$ field of approximately the resonance frequency of the atoms of sufficiently long duration to tip the atom moments through an angle, preferably normal, from their direction of alignment. On termination of the R.F. pulse the atoms are left free to precess at their characteristic resonance frequency in the field $H_E$. The frequency of the precessional modulation of the x-beam of light from source 26 is then measured by the frequency counter 51.

Referring to FIG. 12 there is shown a quantum system in which the light is modulated at twice the precession frequency. In this particular embodiment we employ mercury atoms in vessel 61 aligned in the $M=0$ substrate of the $6^3P_2$ optical state by electron impact techniques as set forth in the above cited Patent 3,071,721. Radiation from a mercury lamp 62 is focused by lens 63 through a polarizer 64 which polarizes the light in a plane perpendicular to the direction of the D.C magnetic field $H_0$. An R.F. generator 65 supplies Larmor frequency signals by means of coil 66 to the atoms normal to $H_0$ to produce resonance transitions between Zeemann levels in the $6^3P_2$ state. As discussed above, the light from source 62 is modulated at twice the Larmor frequency. This modulated light is detected by photocell 67 and transmitted to R.F. amplifier 68 and through the detector 69 to the oscilloscope 71.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The method of monitoring the time variant alignments of magnetic moments of quantum systems in magnetic fields which comprises the steps of producing precessions of the magnetic moments of said quantum system in a magnetic field, irradiating said quantum system with optical radiation having a propagation direction with reference to said field such that the intensity of said radiation which passes through said quantum systems without absorption is modulated at a frequency which varies in accordance with the frequency of said precessions, and detecting the intensity modulation of the non-absorbed optical radiation which has passed through said quantum systems.

2. The method as claimed in claim 1 wherein said quantum systems are atoms and said magnetic moments are the magnetic moments of said atoms.

3. The method as claimed in claim 1 wherein said quantum systems are alkali atoms in vapor form with magnetic moments aligned in a magnetic field.

4. The method of monitoring the precessions of magnetic moments of quantum systems in magnetic fields irradiated by optical resonance radiation passing through said quantum systems which comprises the steps of detecting said optical radiation after it has passed through said quantum systems, producing radio frequency transitions of said quantum systems between sublevels in said magnetic field, and detecting precessions of said moments caused by said transitions as a radio frequency modulation of the intensity of the optical radiation which has passed through said quantum systems, said optical radiation being propagated in a direction such that the frequency of said modulation varies in accordance with the frequency of said precessions.

5. The method as claimed in claim 4 wherein said transition-producing step comprises the step of generating an A.C. output at a frequency effecting transitions governed by the selection rules $\Delta F=0$, $\Delta M_F=\pm 1$.

6. The method as claimed in claim 4 wherein said transition-producing step comprises the step of generating an A.C. output at a frequency effecting transitions governed by the selection rules $\Delta F=+1$, $\Delta M_F=0, \pm 1$.

7. The method of monitoring the precessions of magnetic moments of quantum systems in a unidirectional magnetic field which comprises the steps of optically irradiating said quantum systems with a polarized radiation which passes through said quantum systems and has a spectrum effecting optical excitation of said quantum systems, detecting said optical radiation with an optical radiation responsive means after it has irradiated and passed through said quantum systems, applying a radio frequency magnetic field to said quantum systems at their gyromagnetic resonance frequency in said magnetic field to thereby produce gyromagnetic resonance precessions of said magnetic moments, and detecting said gyromagnetic resonance precessions as a radio frequency modulation of the intensity of said detected optical radiation, the frequency of said modulation being variable in accordance with the frequency of said precessions.

8. The method of producing and detecting gyromagnetic resonance of atoms of alkali elements which comprises the steps of preparing the alkali substance in a vapor form, locating said alkali vapor in a unidirectional magnetic field, optically irradiating said atoms with a radiation having a substantial propagation direction component directed parallel to said unidirectional magnetic field and circularly polarized whereby said atoms become aligned in said unidirectional magnetic field in their ground state, applying to said atoms a radio frequency magnetic field having a substantial component normal to said unidirectional magnetic field and of the gyromagnetic resonance frequency of said atoms in said magnetic field to thereby produce gyromagnetic resonance precessions of said alkali atoms in said magnetic field, optically irradiating said precessing atoms with a radiation having a substantial propagation direction component normal to said unidirectional magnetic field, and detecting said latter optical radiation after it has irradiated and passed through said atoms, said precessing alkali atoms modulating the intensity of said latter optical radiation at the frequency of said precessions.

9. The method as claimed in claim 8 including the step of mixing said alkali vapor with a buffer gas to enhance the alignment of said alkali atoms.

10. The method of measuring the strength of a unidirectional magnetic field which comprises the steps of producing precessions of magnetic moments of quantum systems in said magnetic field, irradiating said precessing quantum systems with an optical resonance radiation having a substantial propagation direction such that the intensity of said optical radiation is modulated at a frequency which varies in accordance with the frequency of said precessions, detecting said optical radiation after it has irradiated and passing through said quantum systems, and measuring the frequency of said modulations, said frequency providing an indication of the strength of said unidirectional magnetic field.

11. The method of producing continuous oscillations from an assemblage of quantum systems which comprises the steps of aligning said quantum systems in a field in which the quantum systems may precess, irradiating said quantum systems with an optical radiation so that precessions of said quantum systems produce a modulation of the intensity of said optical radiation at a frequency which varies in accordance with the frequency of said precessions, detecting said modulated radiation, and coupling a portion of the energy output of said detected radiation to the quantum systems in the form of an alternating magnetic field to produce forced precessions of said quantum systems.

12. Apparatus for producing and detecting gyromagnetic resonance of atoms of alkali elements in a vapor form located in a unidirectional magnetic field which comprises means for optically irradiating said atoms with a radiation beam directed parallel to said unidirectional magnetic field and circularly polarized, said beam having a spectrum effecting optical excitation of said atoms whereby said atoms become aligned in said unidirectional magnetic field in their ground state, means for applying a radio frequency magnetic field to said atoms substantially normal to said unidirectional magnetic field and of the gyromagnetic resonance frequency of said atoms in said magnetic field to thereby produce gyromagnetic resonance precessions of said alkali atoms in said magnetic field, means for optically irradiating said precessing atoms with a second optical radiation having a substantial propagation direction component normal to said unidirectional magnetic field, and optical radiation intensity sensitive means for detecting said latter optical radiation after it has irradiated and passed through said atoms, said precessing alkali atoms modulating the intensity of said latter optical radiation at the frequency of said precessions.

13. Apparatus for producing continuous oscillations which comprises a sample of alkali atoms in vapor form located in a unidirectional magnetic field in which the magnetic moments of said atoms may undergo precessions, optical radiation means for directing circularly polarized resonance radiation through said sample so that said precessions will result in at least a portion of said resonance radiation being intensity modulated by said sample at the frequency of said precessions, means responsive to the intensity modulated radiation which has passed through said sample for detecting the intensity modulation thereof and producing an energy output at the frequency of said modulation, and means coupling a portion of the energy output of said detecting means to said sample in the form of a precession frequency alternating magnetic field having a substantial component normal to said unidirectional field for producing forced precessions of said magnetic moments.

14. Apparatus according to claim 13 wherein said optical radiation means comprises means for producing two optical radiation beams, one of said beams having a substantial propagation direction component parallel to said unidirectional field and the other of said beams having a substantial propagation direction component normal to said unidirectional field.

15. Apparatus according to claim 13 wherein said optical radiation means comprises means for producing a single optical radiation beam having substantial propagation direction components both parallel and perpendicular to said unidirectional field.

16. Apparatus according to claim 13 wherein the detected portion of said resonance radiation is directed at an angle to said unidirectional magnetic field and further including means responsive to the frequency of said intensity modulation for providing an output which varies in accordance with the magnitude of said unidirectional magnetic field.

References Cited in the file of this patent

UNITED STATES PATENTS

| | | |
|---|---|---|
| 2,383,075 | Pineo | Aug. 21, 1945 |
| 2,617,940 | Giguere | Nov. 11, 1952 |
| 2,670,649 | Robinson | Mar. 2, 1954 |
| 2,690,093 | Daly | Sept. 28, 1954 |
| 2,707,235 | Townes | Apr. 26, 1955 |

OTHER REFERENCES

Ingram: Spectroscopy at Radio and Microwave Frequencies, Butterworths Scientific Publications, London, 1955, pp. 116, 117, 126, 127 and 128 relied on.

Ebbinghaus: Annalen der Physik, vol. 7, 1930, pp. 267–275 relied upon.

Carpenter et al.: Physical Review, vol. 46, No. 7, October 1934, pp. 607 to 612.

Kastler: Le Journal de Physics et le Radium, vol. 11, 1950, pp. 255 to 265.

Sagalyn: Physical Review, vol. 94, No. 4, May 15, 1954, pp. 885–892.

Osborn et al.: Physical Review, vol. 45, No. 7, July 1955, pp. 552–555.

Brossel et al.: Physical Review, vol. 86, No. 3, May 1952, pp. 308–316.

Pringsheim: Fluorescence and Phosphorescence, Interscience Publishers, Inc., New York, 1949, pp. 85, 86, and pp. 96–100 principally relied on.

Hawkins: Physical Review, vol. 98, No. 2, April 1955, pp. 478–486.

UNITED STATES PATENT OFFICE
CERTIFICATE OF CORRECTION

Patent No. 3,150,313                              September 22, 1964

Hans George Dehmelt

It is hereby certified that error appears in the above numbered patent requiring correction and that the said Letters Patent should read as corrected below.

Column 1, line 54, for "means" read -- mean --; column 3, line 28, for "references" read -- reference --; line 39, after "state" insert -- to an excited $^2P_{1/2}$ state --; column 4, line 4, after "by" insert -- a --; line 5, strike out "a mixture"; same column 4, lines 73 to 75, the formula should appear as shown below instead of as in the patent:

$$\psi = \cos\tfrac{\theta}{2} e^{\tfrac{-i\omega t}{2}} (+)_z + \sin\tfrac{\theta}{2} e^{\tfrac{i\omega t}{2}} (-)_z$$

column 5, line 55, for "M" read -- $\vec{M}$ --; column 7, lines 35 to 37, the left-hand side of the formula, strike out "$(+)_2$"; column 9, lines 11 to 13, strike out the first closing parenthesis; line 52, for "spilit" read -- split --; column 15, line 52, for "substrate" read -- substate --; line 60, for "Zeemann" read -- Zeeman --; column 16, line 39, for "+1" read -- $\pm 1$ --.

Signed and sealed this 23rd day of February 1965.

(SEAL)
Attest:

ERNEST W. SWIDER                          EDWARD J. BRENNER
Attesting Officer                        Commissioner of Patents